(12) United States Patent
Shin

(10) Patent No.: US 12,464,961 B2
(45) Date of Patent: Nov. 4, 2025

(54) SEMICONDUCTOR DEVICE AND METHOD FOR FABRICATING THE SAME

(71) Applicant: SK hynix Inc., Icheon-si (KR)

(72) Inventor: Gwang Hyuk Shin, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 459 days.

(21) Appl. No.: 17/903,857

(22) Filed: Sep. 6, 2022

(65) Prior Publication Data
US 2023/0165173 A1   May 25, 2023

(30) Foreign Application Priority Data
Nov. 25, 2021   (KR) .......................... 10-2021-0164100

(51) Int. Cl.
| | | |
|---|---|---|
| H10N 70/00 | (2023.01) | |
| G11C 11/16 | (2006.01) | |
| H10B 63/00 | (2023.01) | |
| H10N 50/10 | (2023.01) | |

(52) U.S. Cl.
CPC .......... H10N 70/841 (2023.02); H10B 63/84 (2023.02); H10N 70/882 (2023.02); H10N 70/883 (2023.02)

(58) Field of Classification Search
CPC .. H10N 70/841; H10N 70/882; H10N 70/883; H10N 70/011; H10N 70/821; H10N 50/10; H10N 50/01; H10B 63/84; H10B 63/845; H10B 61/10; H10B 61/00; G06F 12/0831; G06F 12/0875; G11C 11/161
See application file for complete search history.

(56) References Cited

U.S. PATENT DOCUMENTS

| | | | |
|---|---|---|---|
| 2007/0148855 A1 | 6/2007 | Chen et al. | |
| 2015/0228893 A1* | 8/2015 | Narayanan | H10N 70/8833 257/4 |
| 2017/0263683 A1* | 9/2017 | Ramaswamy | H10B 63/845 |
| 2018/0175109 A1* | 6/2018 | Choi | H10N 70/8828 |
| 2019/0165264 A1* | 5/2019 | Wu | H10N 70/826 |
| 2020/0005863 A1* | 1/2020 | Grobis | H10N 70/231 |
| 2020/0176674 A1 | 6/2020 | Luo et al. | |
| 2021/0028230 A1* | 1/2021 | Zhang | H10N 70/028 |
| 2022/0384725 A1* | 12/2022 | Jiang | H10N 70/021 |

FOREIGN PATENT DOCUMENTS

| | | |
|---|---|---|
| KR | 20160018761 A | 2/2016 |
| KR | 20180069463 A | 6/2018 |

OTHER PUBLICATIONS

Office Action for KR Appl. No. 10-2021-0164100, mailed on Dec. 17, 2024, 8 pages.

\* cited by examiner

*Primary Examiner* — Omar F Mojaddedi
(74) *Attorney, Agent, or Firm* — Perkins Coie LLP

(57) ABSTRACT

A semiconductor device may include: a first conductive line including an opening passing through the first conductive line; a second conductive line disposed over the first conductive line and spaced apart from the first conductive line; a first electrode layer buried in the opening; a selector layer disposed in the opening and surrounding side surfaces of the first electrode layer; and a variable resistance layer disposed over the selector layer and the first electrode layer.

12 Claims, 22 Drawing Sheets

SEMICONDUCTOR DEVICE AND METHOD FOR FABRICATING THE SAME

PRIORITY CLAIM AND CROSS-REFERENCE TO RELATED APPLICATION

This patent document claims the priority and benefits of Korean Patent Application No. 10-2021-0164100 filed on Nov. 25, 2021, which is incorporated herein by reference in its entirety.

TECHNICAL FIELD

This patent document relates to memory circuits or devices and their applications in electronic devices or systems.

BACKGROUND

The recent trend toward miniaturization, low power consumption, high performance, and multi-functionality in the electrical and electronics industry has compelled the semiconductor manufacturers to focus on high-performance, high capacity semiconductor devices. Examples of such high-performance, high capacity semiconductor devices include memory devices that can store data by switching between different resistance states according to an applied voltage or current. The semiconductor devices may include an RRAM (resistive random access memory), a PRAM (phase change random access memory), an FRAM (ferroelectric random access memory), an MRAM (magnetic random access memory), and an electronic fuse (E-fuse).

SUMMARY

The disclosed technology in this patent document includes memory circuits or devices and their applications in semiconductor devices or systems and various implementations of a semiconductor device that can improve the performance of a semiconductor device and reduce manufacturing defects.

In one aspect, a semiconductor device may include: a first conductive line including an opening passing through the first conductive line; a second conductive line disposed over the first conductive line and spaced apart from the first conductive line; a first electrode layer buried in the opening; a selector layer disposed in the opening and surrounding side surfaces of the first electrode layer; and a variable resistance layer disposed over the selector layer and the first electrode layer.

In another aspect, a method for fabricating a semiconductor device may include: forming a first conductive line over a substrate; forming an opening passing through the first conductive line; forming a first electrode layer in the via hole and a selector layer disposed in the via hole and surrounding side surfaces of the first electrode layer; forming a variable resistance layer over the first electrode layer and the selector layer; and forming a second conductive line over the variable resistance layer.

DETAILED DESCRIPTION

Hereinafter, various embodiments of the disclosure will be described in detail with reference to the accompanying drawings.

Figure 1A:
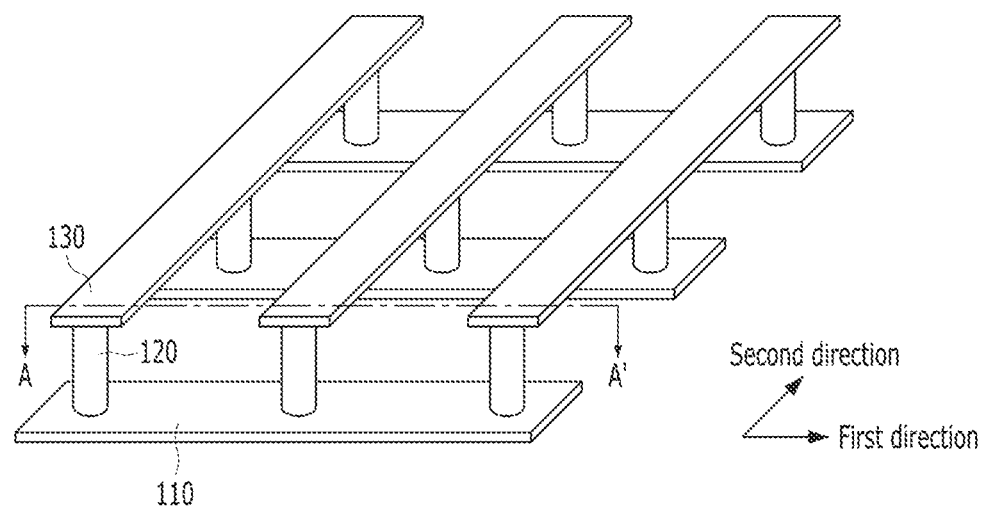
FIGS. 1A and 1B illustrate an example of a semiconductor device based on some implementations of the disclosed technology.
Figure 1B:
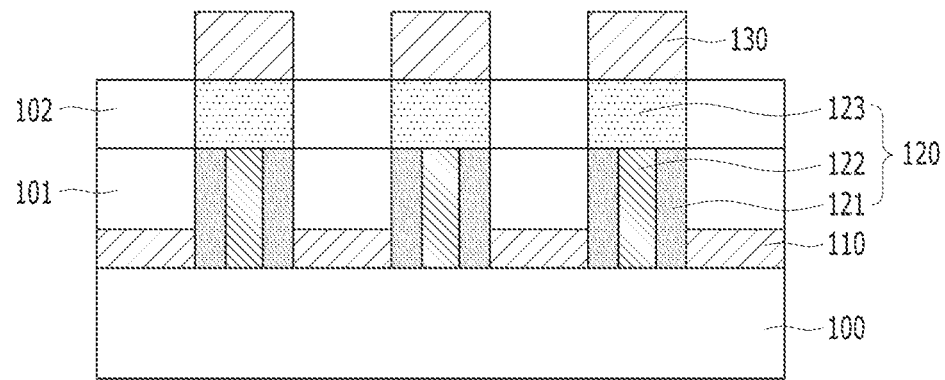

FIGS. 1A and 1B illustrate a semiconductor device based on some implementations of the disclosed technology. FIG. 1A is a perspective view, and FIG. 1B is a cross-sectional view taken along line A-A' of FIG. 1A.

Referring to FIGS. 1A and 1B, the semiconductor device may include a cross-point structure including a substrate 100, first conductive lines 110 formed over the substrate 100 and extending in a first direction, second conductive lines 130 formed over the first conductive lines 110 to be spaced apart from the first conductive lines 110 and extending in a second direction crossing the first direction, and memory cells 120 disposed at intersections of the first conductive lines 110 and the second conductive lines 130 between the first conductive lines 110 and the second conductive lines 130. In this patent document, the conductive lines can indicate conductive structures that electrically connect two or more circuit elements in the semiconductor memory. In some implementations, the conductive lines include word lines that are used control access to memory cells in the memory device and bit lines that are used to read out information stored in the memory cells. In some implementations, the conductive lines include interconnects that carry signals between different circuit elements in the semiconductor memory.

The substrate 100 may include a semiconductor material such as silicon. A required lower structure (not shown) may be formed in the substrate 100. For example, the substrate 100 may include a driving circuit (not shown) electrically connected to the first conductive lines 110 and/or the second conductive lines 130 to control operations of the memory cells 120. In this patent document, the conductive lines can indicate conductive structures that electrically connect two or more circuit elements in the semiconductor device. In some implementations, the conductive lines include word lines that are used control access to memory cells in the memory device and bit lines that are used to read out information stored in the memory cells. In some implementations, the conductive lines include interconnects that carry signals between different circuit elements in the semiconductor device.

The first conductive lines 110 and the second conductive lines 130 may be connected to a lower end and an upper end of the memory cell 120, respectively, and may provide a voltage or a current to the memory cell 120 to drive the memory cell 120. When the first conductive lines 110 functions as a word line, the second conductive lines 130 may function as a bit line. Conversely, when the first conductive lines 110 functions as a bit line, the second conductive lines 130 may function as a word line. The first conductive lines 110 and the second conductive lines 130 may include a single-layer or multilayer structure including one or more of various conductive materials. Examples of the conductive materials may include a metal, a metal nitride, or a conductive carbon material, or a combination thereof, but are not limited thereto. For example, the first conductive lines 110 and the second conductive lines 130 may include tungsten (W), titanium (Ti), tantalum (Ta), platinum (Pt), aluminum (Al), copper (Cu), zinc (Zn), nickel (Ni), cobalt (Co), lead (Pb), tungsten nitride (WN), tungsten silicide (WSi), titanium nitride (TiN), titanium silicon nitride (TiSiN), titanium aluminum nitride (TiAlN), tantalum nitride (TaN), tantalum silicon nitride (TaSiN), tantalum aluminum nitride (TaAlN), carbon (C), silicon carbide (SiC), or silicon carbon nitride (SiCN), or a combination thereof.

The memory cell 120 may be arranged in a matrix having rows and columns along the first direction and the second direction so as to overlap the intersection regions between the first conductive lines 110 and the second conductive lines 130. In an implementation, each of the memory cells 120 may have a size that is substantially equal to or smaller than that of the intersection region between each corresponding pair of the first conductive lines 110 and the second conductive lines 130. In another implementation, each of the memory cells 120 may have a size that is larger than that of the intersection region between each corresponding pair of the first conductive lines 110 and the second conductive lines 130.

Spaces between the first conductive lines 110, the second conductive lines 130 and the memory cell 120 may be filled with a first dielectric layer 101 and a second dielectric layer 102.

The memory cell 120 may include a stacked structure including a selector layer 121, a first electrode 122 and a variable resistance layer 123.

The variable resistance layer 123 may be used to store data by switching between different resistance states according to an applied voltage or current. The variable resistance layer 123 may have a single-layered structure or a multilayered structure including at least one of materials having a variable resistance characteristic used for a RRAM, a PRAM, an MRAM, an FRAM, and others. For example, the variable resistance layer 123 may include a metal oxide such as a transition metal oxide or a perovskite-based oxide, a phase change material such as a chalcogenide-based material, a ferromagnetic material, a ferroelectric material, or others. However, the implementations are not limited thereto, and the memory cell 120 may include other memory layers capable of storing data in various ways instead of the variable resistance layer 123.

In some implementations, the variable resistance layer 123 may include a magnetic tunnel junction (MTJ) structure. This will be explained with reference to FIG. 1C.

Figure 1C:
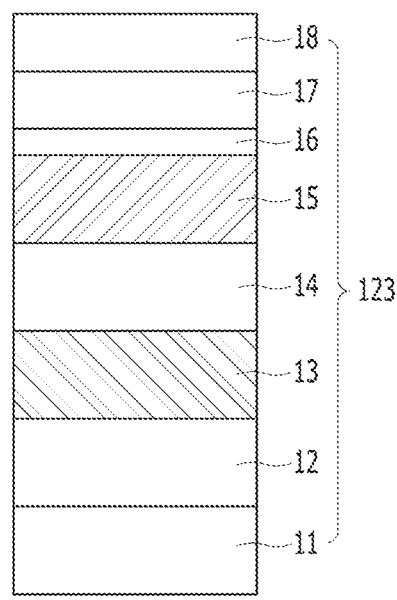
FIG. 1C illustrates an example of a magnetic tunnel junction (MTJ) structure included in a variable resistance layer based on some implementations of the disclosed technology.

FIG. 1C illustrates an example of a magnetic tunnel junction (MTJ) structure included in the variable resistance layer 123.

The variable resistance layer 123 may include an MTJ structure including a free layer 13 having a variable magnetization direction, a pinned layer 15 having a pinned magnetization direction and a tunnel barrier layer 14 interposed between the free layer 13 and the pinned layer 15.

The free layer 13 may have one of different magnetization directions or one of different spin directions of electrons to switch the polarity of the free layer 13 in the MTJ structure, resulting in changes in resistance value. In some implementations, the polarity of the free layer 13 is changed or flipped upon application of a voltage or current signal (e.g., a driving current above a certain threshold) to the MTJ structure. With the polarity changes of the free layer 13, the free layer 13 and the pinned layer 15 have different magnetization directions or different spin directions of electron, which allows the variable resistance layer 123 to store different data or represent different data bits. The free layer 13 may also be referred as a storage layer. The magnetization direction of the free layer 13 may be substantially perpendicular to a surface of the free layer 13, the tunnel barrier layer 14 and the pinned layer 15. In other words, the magnetization direction of the free layer 13 may be substantially parallel to stacking directions of the free layer 13, the tunnel barrier layer 14 and the pinned layer 15. Therefore, the magnetization direction of the free layer 13 may be changed between a downward direction and an upward direction. The change in the magnetization direction of the free layer 13 may be induced by a spin transfer torque generated by an applied current or voltage.

The free layer 13 may have a single-layer or multilayer structure including a ferromagnetic material. For example, the free layer 13 may include an alloy based on Fe, Ni or Co, for example, an Fe—Pt alloy, an Fe—Pd alloy, a Co—Pd alloy, a Co—Pt alloy, a Co—Fe alloy, an Fe—Ni—Pt alloy, a Co—Fe—Pt alloy, a Co—Ni—Pt alloy, or a Co—Fe—B alloy, or others, or may include a stack of metals, such as Co/Pt, or Co/Pd, or others.

The tunnel barrier layer 14 may allow the tunneling of electrons in both data reading and data writing operations. In a write operation for storing new data, a high write current may be directed through the tunnel barrier layer 14 to change the magnetization direction of the free layer 13 and thus to change the resistance state of the MTJ for writing a new data bit. In a reading operation, a low reading current may be directed through the tunnel barrier layer 14 without changing the magnetization direction of the free layer 13 to measure the existing resistance state of the MTJ under the existing magnetization direction of the free layer 13 to read the stored data bit in the MTJ. The tunnel barrier layer 14 may include a dielectric oxide such as MgO, CaO, SrO, TiO, VO, or NbO or others.

The pinned layer 15 may have a pinned magnetization direction, which remains unchanged while the magnetization direction of the free layer 13 changes. The pinned layer 15 may be referred to as a reference layer. In some implementations, the magnetization direction of the pinned layer 15 may be pinned in a downward direction. In some implementations, the magnetization direction of the pinned layer 15 may be pinned in an upward direction.

The pinned layer 15 may have a single-layer or multilayer structure including a ferromagnetic material. For example, the pinned layer 15 may include an alloy based on Fe, Ni or Co, for example, an Fe—Pt alloy, an Fe—Pd alloy, a Co—Pd alloy, a Co—Pt alloy, a Co—Fe alloy, an Fe—Ni—Pt alloy, a Co—Fe—Pt alloy, a Co—Ni—Pt alloy, or a Co—Fe—B alloy, or may include a stack of metals, such as Co/Pt, or Co/Pd or others.

If a voltage or current is applied to the variable resistance layer 123, the magnetization direction of the free layer 13 may be changed by spin torque transfer. In some implementations, when the magnetization directions of the free layer 13 and the pinned layer 15 are parallel to each other, the variable resistance layer 123 may be in a low resistance state, and this may indicate digital data bit "0." Conversely, when the magnetization directions of the free layer 13 and the pinned layer 15 are anti-parallel to each other, the variable resistance layer 123 may be in a high resistance state, and this may indicate a digital data bit "1." In some implementations, the variable resistance layer 123 can be configured to store data bit '1' when the magnetization directions of the free layer 13 and the pinned layer 15 are parallel to each other and to store data bit '0' when the magnetization directions of the free layer 13 and the pinned layer 15 are anti-parallel to each other.

In some implementations, the variable resistance layer 123 may further include one or more layers performing various functions to improve a characteristic of the MTJ structure. For example, the variable resistance layer 123 may further include at least one of a buffer layer 11, an under layer 12, a spacer layer 16, a magnetic correction layer 17 and a capping layer 18.

The under layer 12 may be disposed under the free layer 13 and serve to improve perpendicular magnetic crystalline anisotropy of the free layer 13. The under layer 12 may have a single-layer or multilayer structure including a metal, a metal alloy, a metal nitride, or a metal oxide, or a combination thereof.

The buffer layer 11 may be disposed below the under layer 12 to facilitate crystal growth of the under layer 12, thus improving perpendicular magnetic crystalline anisotropy of the free layer 13. The buffer layer 11 may have a single-layer or multilayer structure including a metal, a metal alloy, a metal nitride, or a metal oxide, or a combination thereof. Moreover, the buffer layer 11 may be formed of or include a material having a good compatibility with a bottom electrode (not shown) in order to resolve the lattice constant mismatch between the bottom electrode and the under layer 12. For example, the buffer layer 11 may include tantalum (Ta).

The spacer layer 16 may be interposed between the magnetic correction layer 17 and the pinned layer 15 and function as a buffer between the magnetic correction layer 17 and the pinned layer 15. The spacer layer 16 may be used to improve characteristics of the magnetic correction layer 17. The spacer layer 16 may include a noble metal such as ruthenium (Ru).

The magnetic correction layer 17 may be used to offset the effect of the stray magnetic field produced by the pinned layer 15. In this case, the effect of the stray magnetic field of the pinned layer 15 can decrease, and thus a biased magnetic field in the free layer 13 can decrease. The magnetic correction layer 17 may have a magnetization direction anti-parallel to the magnetization direction of the pinned layer 15. In the implementation, when the pinned layer 15 has a downward magnetization direction, the magnetic correction layer 17 may have an upward magnetization direction. Conversely, when the pinned layer 15 has an upward magnetization direction, the magnetic correction layer 17 may have a downward magnetization direction. The magnetic correction layer 17 may be exchange coupled with the pinned layer 15 via the spacer layer 16 to form a synthetic anti-ferromagnet (SAF) structure. The magnetic correction layer 17 may have a single-layer or multilayer structure including a ferromagnetic material.

In this implementation, the magnetic correction layer 17 is located above the pinned layer 15, but the magnetic correction layer 17 may disposed at a different location. For example, the magnetic correction layer 17 may be located above, below, or next to the MTJ structure while the magnetic correction layer 17 is patterned separately from the MTJ structure.

The capping layer 18 may be used to protect the variable resistance layer 123 and/or function as a hard mask for patterning the variable resistance layer 123. In some implementations, the capping layer 18 may include various conductive materials such as a metal. In some implementations, the capping layer 18 may include a metallic material having almost none or a small number of pin holes and high resistance to wet and/or dry etching. In some implementations, the capping layer 18 may include a metal, a nitride, or an oxide, or a combination thereof. For example, the capping layer 18 may include a noble metal such as ruthenium (Ru).

The capping layer 18 may have a single-layer or multilayer structure. In some implementations, the capping layer 18 may have a multilayer structure including an oxide, or a metal, or a combination thereof. For example, the capping layer 18 may have a multilayer structure of an oxide layer, a first metal layer and a second metal layer.

A material layer (not shown) for resolving the lattice structure differences and the lattice constant mismatch between the pinned layer 15 and the magnetic correction layer 17 may be interposed between the pinned layer 15 and the magnetic correction layer 17. For example, this material layer may be amorphous and may include a metal a metal nitride, or metal oxide.

The selector layer 121 may function to reduce and/or suppress a leakage current between the memory cells 120 sharing the first conductive lines 110 or the second conductive lines 130.

To form a high-density cross-point array, a memory layer and a selector layer have been usually formed on an upper portion and a lower portion of the same element. The memory layer may correspond to the variable resistance layer 123 and the selector layer may correspond to the selector layer 121. The memory layer and the selector layer may be formed by depositing materials layer for forming the memory layer and the selector layer and etching the material layers by performing patterning processes. The memory layer such as MTJ has a stacked structure of various different layers including different materials. Among those layers, the memory layer and the selector layer include very sensitive materials whose characteristics can be changed during the subsequent process or affected by other layers, which result in influencing the basic characteristic of the element. For example, the memory layer and the selector layer may be damaged when the patterning processes are performed. For example, when the selector layer is disposed on the lower portion of the same element and the memory layer is disposed on the upper portion, materials in the memory layer may be redeposited or knocked on sidewalls of the selector layer. The redeposited or knocked materials may cause break down or deteriorate characteristics of the selector layer.

In order to overcome these problems, in some implementations of the disclosed technology, the selector layer 121 may be formed in a direction perpendicular to surfaces of the substrate 100, the first conductive lines 110, the first dielectric layer 101, the variable resistance layer 123 and the second conductive lines 130. Thus, the selector layer 121 may be formed on sidewalls of the first electrode layer 122 in a via hole passing through the first conductive lines 110 and the first dielectric layer 101. The via hole is the example only and any other structure passing through the first conductive lines 110 and the first dielectric layer 101 can be implemented. In some implementations, a trench or a groove can be implemented instead of the via hole. In some descriptions, an opening refers to any structure which is formed through the first conductive lines 110 and the first dielectric layer implementations. Although the structures and manufacturing process of the memory cells are described using the via hole, the same descriptions can be applied to any other opening structures. The variable resistance layer 123 may be formed over the selector layer 121 and the first electrode layer 122.

In the implementations of the disclosed technology, the selector layer 121 may be formed in a direction perpendicular to the surfaces of the substrate 100, the first conductive lines 110, the first dielectric layer 101, the variable resistance layer 123, the second conductive lines 130, the second dielectric layer 102. Thus, it is possible to prevent deterioration of the performance of the selector layer 121 due to re-deposition or knocking on the side of the selector layer 121 when patterning the variable resistance layer 123. Moreover, it is possible to prevent deterioration of the performance of the variable resistance layer 123 due to roughness of the selector layer 121 compared to the case where the selector layer 121 is formed in a horizontal direction with respect to the surfaces of the substrate 100, the first conductive lines 110, the first dielectric layer 101, the variable resistance layer 123, the second conductive lines 130, the second dielectric layer 102.

The selector layer 121 may serve to control access to the variable resistance layer 123. To this end, the selector layer 121 may have a threshold switching characteristic that blocks or substantially limits a current when a magnitude of an applied voltage is less than a predetermined threshold value and allows the current to increase rapidly when the magnitude of the applied voltage is equal to or greater than the predetermined threshold value. This threshold value may be referred to as a threshold voltage, and the selector layer 121 may controlled to be in either a turned-on or "on" state to be electrically conductive or a turned-off or "off" state to be electrically less-conductive than the "on" state or electrically non-conductive depending on whether the applied voltage is above or below the threshold voltage. Thus, the selector layer 121 exhibits different electrically conductive states to provide a switching operation to switch between the different electrical conductive states by controlling the applied voltage relative to the threshold voltage. The selector layer 121 may include an MIT (Metal Insulator Transition) material such as $NbO_2$, $TiO_2$, $VO_2$, $WO_2$, or others, an MIEC (Mixed Ion-Electron Conducting) material such as $ZrO_2(Y_2O_3)$, $Bi_2O_3$—BaO, $(La_2O_3)x(CeO_2)_{1-x}$, or others, an OTS (Ovonic Threshold Switching) material including chalcogenide material such as $Ge_2Sb_2Te_5$, $As_2Te_3$, $As_2$, $As_2Se_3$, or others, or a tunneling insulating material such as silicon oxide, silicon nitride, a metal oxide, or others. A thickness of the tunneling insulating layer is sufficiently small to allow tunneling of electrons under a given voltage or a given current. The selector layer 121 may include a single-layer or multilayer structure.

In some implementations, the selector layer 121 may perform a threshold switching operation through a doped region formed in a material layer for the selector layer 121. Thus, a size of the threshold switching operation region may be controlled by a distribution area of the dopants. The dopants may form trap sites for charge carriers in the material layer for the selector layer 121. The trap sites may capture the charge carriers moving in the selector layer 121 based on an external voltage applied to the selector layer 121. The trap sites thereby provide a threshold switching characteristic and are used to perform a threshold switching operation.

In some implementations, the selector layer 121 may include a dielectric material having incorporated dopants. The selector layer 121 may include an oxide with dopants, a nitride with dopants, or an oxynitride with dopants, or a combination thereof such as silicon oxide, titanium oxide, aluminum oxide, tungsten oxide, hafnium oxide, tantalum oxide, niobium oxide, silicon nitride, titanium nitride, aluminum nitride, tungsten nitride, hafnium nitride, tantalum nitride, niobium nitride, silicon oxynitride, titanium oxynitride, aluminum oxynitride, tungsten oxynitride, hafnium oxynitride, tantalum oxynitride, or niobium oxynitride, or a combination thereof. The dopants doped into the selector layer 121 may include an n-type dopant or a p-type dopant and be incorporated for example, by ion implantation process. Examples of the dopants may include one or more of boron (B), nitrogen (N), carbon (C), phosphorous (P), arsenic (As), aluminum (Al), silicon (Si) or germanium (Ge). For example, the selector layer 121 may include As-doped silicon oxide or Ge-doped silicon oxide.

The first electrode layer 122 may be buried in the via hole passing through the first conductive lines 110 and the variable resistance layer 123. Side surfaces of the first electrode layer 122 may be surrounded by the selector layer 121 in the via hole.

The first electrode layer 122 may include a single-layer or multilayer structure including various conductive materials such as a metal, a metal nitride, a conductive carbon material, or a combination thereof. For example, the first electrode layer 122 may include tungsten (W), titanium (Ti), tantalum (Ta), platinum (Pt), aluminum (Al), copper (Cu), copper (Cu), zinc (Zn), nickel (Ni), cobalt (Co), lead (Pb), tungsten nitride (WN), tungsten silicide (WSi), titanium nitride (TiN), titanium silicon nitride (TiSiN), titanium aluminum nitride (TiAlN), tantalum nitride (TaN), tantalum silicon nitride (TaSiN), tantalum aluminum nitride (TaAlN), carbon (C), silicon carbide (SiC), or silicon carbon nitride (SiCN), or a combination thereof.

In some implementations, each of the memory cells 120 includes the selector layer 121, the first electrode layer 122 and the variable resistance layer 123. The structures of the memory cells 120 may be varied without being limited to one as shown in FIGS. 1A and 1B as long as the memory cells 120 have data storage properties. In some implementations, in addition to the layers 121 to 123 shown in FIG. 1B, the memory cells 120 may further include one or more layers (not shown) for enhancing characteristics of the memory cells 120 or improving fabricating processes.

In some implementations, neighboring memory cells of the plurality of memory cells 120 may be spaced apart from each other at a predetermined interval, and trenches may be present between the plurality of memory cells 120. A trench between neighboring memory cells 120 may have a height to width ratio (i.e., an aspect ratio) in a range from 1:1 to 40:1, from 10:1 to 40:1, from 10:1 to 20:1, from 5:1 to 10:1, from 10:1 to 15:1, from 1:1 to 25:1, from 1:1 to 30:1, from 1:1 to 35:1, or from 1:1 to 45:1.

In some implementations, the trench may have sidewalls that are substantially perpendicular to an upper surface of the substrate 100. In some implementations, neighboring trenches may be spaced apart from each other by an equal or similar distance.

In some implementations, the semiconductor device may include further layers in addition to the first conductive lines 110, the memory cell 120 and the second conductive lines 130.

Although one cross-point structure has been described, two or more cross-point structures may be stacked in a vertical direction perpendicular to a top surface of the substrate 100.

A method for fabricating a semiconductor device will be explained with reference to FIGS. 2A to 2G. The detailed descriptions similar to those described in the implementation of FIGS. 1A to 1C will be omitted.

FIGS. 2A to 2G are cross-sectional views illustrating an example method for fabricating a semiconductor device based on some implementations of the disclosed technology.

Figure 2A:
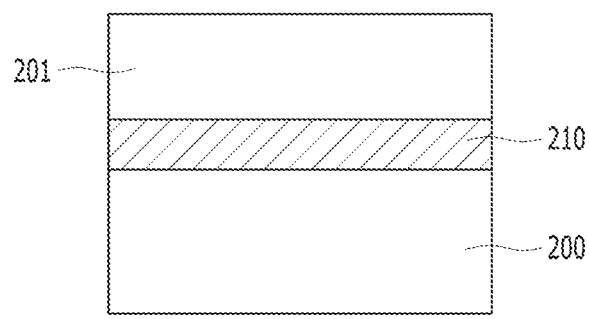
FIGS. 2A to 2G are cross-sectional views illustrating an example method for fabricating a semiconductor device based on some implementations of the disclosed technology.

Referring to FIG. 2A, first conductive lines 210 may be formed over a substrate 200 in which a predetermined structure is formed. The first conductive lines 210 may be formed by forming a conductive layer for the first conductive lines 210 and etching the conductive layer using a mask pattern in a line shape extending in a first direction. An insulating layer (not shown) may be formed between the substrate 200 and the first conductive lines 210.

A first dielectric layer 201 may be formed on the first conductive lines 210. The first dielectric layer 201 may include an oxide, a nitride, or a combination thereof. For example, the first dielectric layer 201 may include silicon oxide, silicon nitride, or a combination thereof.

Figure 2B:
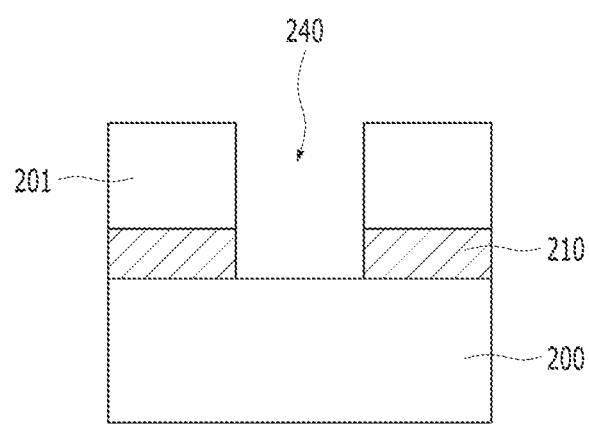

Referring to FIG. 2B, a via hole 240 passing through the first dielectric layer 201 and the first conductive lines 210 may be formed. As discussed above, the via hole 240 is the example only and any other opening structure passing through the first conductive lines 210 and the first dielectric layer 201 can be implemented. The via hole 240 may provide a space where a selector layer (see, reference numeral 221 of FIG. 2E) and a first electrode layer (see, reference numeral 222 of FIG. 2E) are formed in a subsequent process.

The via hole 240 may be formed by etching the first dielectric layer 201 and the first conductive lines 210 to expose the substrate 200. When the insulating layer (not shown) is formed between the substrate 200 and the first conductive lines 210, the dielectric layer may be exposed by the via hole 240.

The etch process for forming the via hole 240 may be a wet etch process or a dry etch process.

Figure 2C:
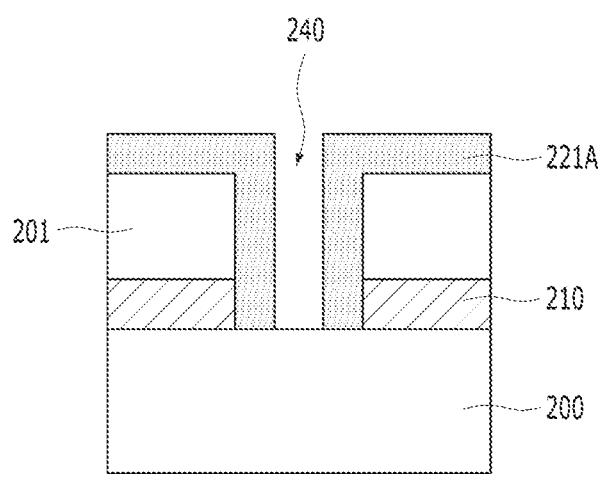

Referring to FIG. 2C, a material layer 221A for the selector layer may be formed on side surfaces of the via hole 240 in the via hole 240 and over the first dielectric layer 201.

The material layer 221A may include an MIT (Metal Insulator Transition) material such as NbO$_2$, TiO$_2$, VO$_2$, WO$_2$, or others, an MIEC (Mixed Ion-Electron Conducting) material such as ZrO$_2$(Y$_2$O$_3$), Bi$_2$O$_3$—BaO, (La$_2$O$_3$)x (CeO$_2$)$_{1-x}$, or others, an OTS (Ovonic Threshold Switching) material including chalcogenide material such as Ge$_2$Sb$_2$Te$_5$, As$_2$Te$_3$, As$_2$, As$_2$Se$_3$, or others, or a tunneling insulating material such as silicon oxide, silicon nitride, a metal oxide, or others. A thickness of the tunneling insulating layer is sufficiently small to allow tunneling of electrons under a given voltage or a given current. The material layer 221A may include a single-layer or multilayer structure.

Figure 2D:
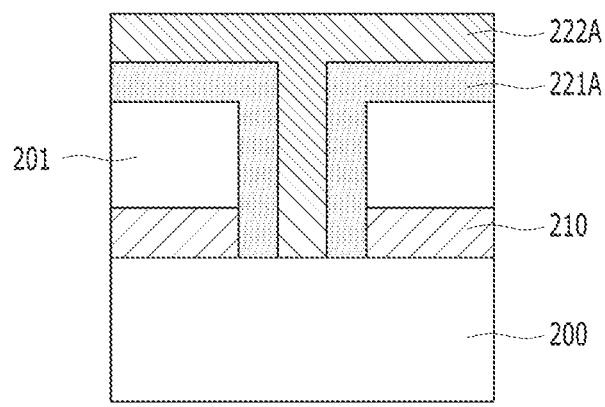

Referring to FIG. 2D, a material layer 222A for the first electrode layer may be formed on the structure of FIG. 2C. The material layer 222A may be formed to cover the material layer 221A and fill the via hole 240.

The material layer 222A may include a single-layer or multilayer structure including various conductive materials such as a metal, a metal nitride, a conductive carbon material, or a combination thereof. For example, material layer 222A may include tungsten (W), titanium (Ti), tantalum (Ta), platinum (Pt), aluminum (Al), copper (Cu), copper (Cu), zinc (Zn), nickel (Ni), cobalt (Co), lead (Pb), tungsten nitride (WN), tungsten silicide (WSi), titanium nitride (TiN), titanium silicon nitride (TiSiN), titanium aluminum nitride (TiAlN), tantalum nitride (TaN), tantalum silicon nitride (TaSiN), tantalum aluminum nitride (TaAlN), carbon (C), silicon carbide (SiC), or silicon carbon nitride (SiCN), or a combination thereof.

Figure 2E:
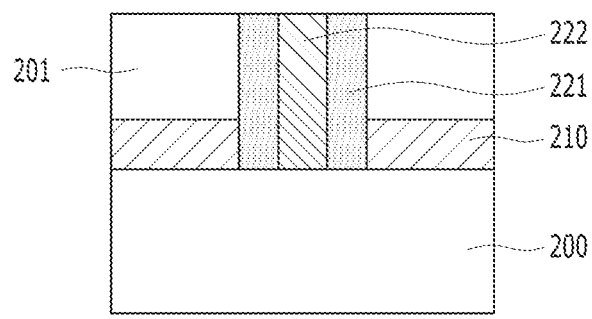

Referring to FIG. 2E, a planarization process such as a chemical mechanical planarization (CMP) process may be performed to expose an upper surface of the first dielectric layer 201. By the planarization process, the first electrode layer 222 and the selector layer 221 surrounding the first electrode layer 222 may be formed in the via hole 240 passing through the first dielectric layer 201 and the first conductive lines 210. That is, the selector layer 221 may be formed on sidewalls of the via hole 240 in the via hole 240, the first electrode layer 222 may be buried in the via hole 240 and the side surfaces of the first electrode layer 222 may be surrounded by the selector layer 221.

In the implementation, the selector layer 221 and the first electrode layer 222 may be formed in a vertical direction with respect to the surfaces of the first conductive lines 210 and the first dielectric layer 201.

Figure 3:
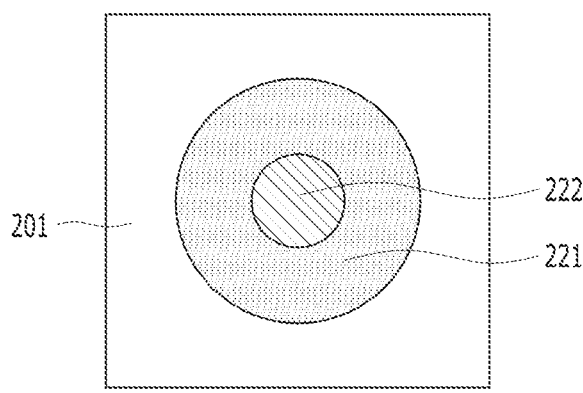
FIG. 3 is a top view of the structure illustrated in FIG. 2E.

FIG. 3 is a top view of the structure illustrated in FIG. 2E.

Referring to FIG. 3, the first electrode layer 222 may be buried in the via hole 240 passing through the first dielectric layer 201, and the selector layer 221 may be formed to surround the first electrode layer 222 in the via hole 240.

In the implementation, the selector layer 221 and the first electrode layer 222 may be formed by forming the material layer 221A and the material layer 222A, and then performing the planarization process on both the material layer 221A and the material layer 222A. However, in another implementation, the selector layer 221 and the first electrode layer 222 may be formed by forming the material layer 221A, performing the planarization process on the material layer 221A, forming the material layer 222A and performing the planarization process on the material layer 222A. That is, the selector layer 221 may be formed by forming the material layer 221A on the sidewalls of the via hole 240 and over the first dielectric layer 201, and performing the planarization process to expose the upper surface of the first dielectric layer 201. The selector layer 221 may be formed on the sidewalls of the via hole 240 in the via hole 240. Then, the first electrode layer 222 may be formed by forming the material layer 222A to cover the first dielectric layer 201 and fill the via hole 240 and performing the planarization process to expose the upper surface of the first dielectric layer 201. The first electrode layer 222 may be formed to fill the via hole 240.

Figure 2F:
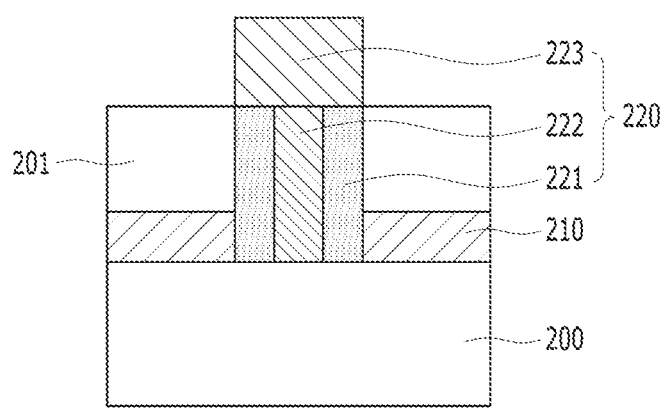

Referring to FIG. 2F, a variable resistance layer 223 may be formed on the selector layer 221 and the first electrode layer 222.

The variable resistance layer 223 may include a material used for RRAM, PRAM, FRAM, MRAM, or others. The variable resistance layer 223 may be formed by forming material layers for the variable resistance layer 223 and patterning the material layers using a mask pattern (not shown). The patterning process may include a etch process such as an ion beam etch (IBE) process.

In accordance with the implementation, before patterning the variable resistance layer 223, the selector layer 221 has been already formed in the via hole 240 in a direction perpendicular to the surfaces of the first dielectric layer 201 and the first conductive lines 210. Therefore, it is possible to prevent materials included in the variable resistance layer 223 from re-depositing or knocking on the sidewalls of the selector layer 221 when patterning the variable resistance layer 223. Accordingly, it is possible to effectively prevent break down or deterioration of the selector layer 221 caused by re-deposition or knocking when pattering the variable resistance layer 223 and improve the performance of the selector layer 221.

According to the implementation, since the selector layer 221 is formed in a vertical direction, it is possible to exhibit an additional advantage compared to the case where the selector layer 221 is formed in a horizontal direction. In this context, the vertical direction may mean a direction perpendicular to the surfaces of the substrate 200, the first dielectric layer 201 and the first conductive lines 210, the horizontal direction may mean a direction parallel to the surfaces of the substrate 200, the first dielectric layer 201 and the first conductive lines 210. When the selector layer 221 is formed in a horizontal direction and has a large surface roughness, the performance and yield of the memory layer such as MTJ may be deteriorated due to the surface roughness. However, in the implementation, since the selector layer 221 is formed in a vertical direction, it is possible to reduce the influence of the surface roughness of the selector layer 221 and thus prevent deterioration of the performance of the variable resistance layer 223.

Figure 2G:
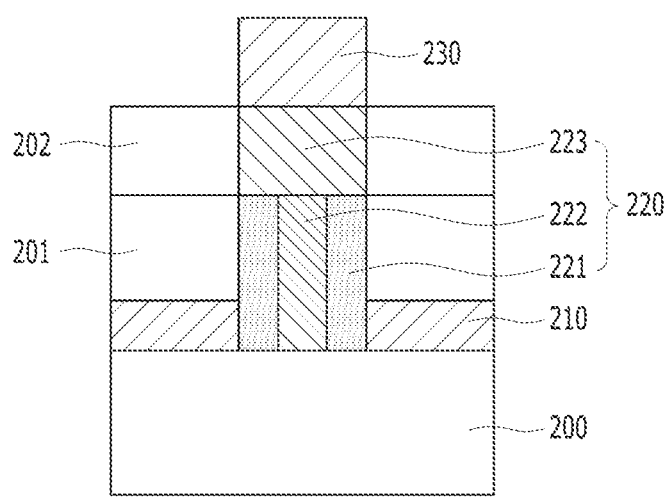

Referring to FIG. 2G, a second dielectric layer 202 may be formed to surround the side surfaces of the variable resistance layer 223 on the structure of FIG. 2F. The second dielectric layer 202 may include oxide, nitride, or a combination thereof. For example, the second dielectric layer 202 may include silicon oxide, silicon nitride, or a combination thereof.

Second conductive lines 230 may be formed on the variable resistance layer 223.

The second conductive lines 230 may be formed by forming a conductive layer for the second conductive lines 230 and etching the conductive layer using a mask pattern in a line shape extending in a second direction. The second conductive lines 230 may include a single-layer or multi-layer structure including one or more of various conductive materials.

The semiconductor device fabricated by the method of FIGS. 2A to 2G may include the substrate 200, the first conductive lines 210, the memory cell 220, the second conductive lines 230, the first dielectric layer 201 and the second dielectric layer 202. The memory cell 220 may include the selector layer 221, the first electrode layer 222 and the variable resistance layer 223. The selector layer 221 may be formed in the via hole 240 passing through the first dielectric layer 201 and the first conductive lines 210 to surround the first electrode layer 222. The selector layer 221 may be formed in a vertical direction with respect to the surfaces of the substrate 200, the first conductive lines 210, the second conductive lines 230, the first dielectric layer 201 and the second dielectric layer 202. The first electrode layer 222 may be surrounded by the selector layer 221 in the via hole 240.

According to the implementation, since the first electrode layer 222 and the selector layer 221 may be formed in a vertical direction in the via hole 240, it is possible to prevent re-deposition or knocking on the sidewalls of the selector layer 221 when pattering the variable resistance layer 223. Therefore, the performance of the selector layer 221 can be improved and the deterioration of the variable resistance layer 223 caused by the surface roughness of the selector layer 221 can be prevented.

The substrate 200, the first conductive lines 210, the memory cell 220, the second conductive lines 230, the first dielectric layer 201, the second dielectric layer 202, the selector layer 221, the first electrode layer 222 and the variable resistance layer 223, which are shown in FIGS. 2A to 2G, may respectively correspond to the substrate 100, the first conductive lines 110, the memory cell 120, the second conductive lines 130, the first dielectric layer 101, the second dielectric layer 102, the selector layer 121, the first electrode layer 122 and the variable resistance layer 123, which are shown in FIG. 1B.

FIGS. 4A to 4G are cross-sectional views illustrating another example method for fabricating a semiconductor device based on some implementations of the disclosed technology. The implementation shown in FIGS. 4A to 4G may be similar to the implementation shown in FIGS. 2A to 2G except that a contact layer (see, reference numeral 424 of FIG. 4D) is further formed and the planarization process on a material layer for a selector layer 321 and the planarization process on a material layer for a first electrode layer 322 are separately performed. The detailed description similar to those described in the implementation of FIGS. 2A to 2G will be omitted.

Figure 4A:
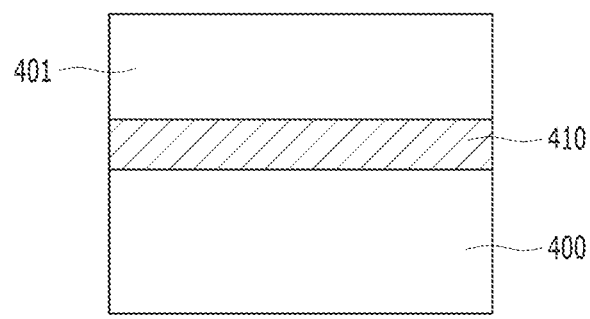
FIGS. 4A to 4G are cross-sectional views illustrating another example method for fabricating a semiconductor device based on some implementations of the disclosed technology.

Referring to FIG. 4A, first conductive lines 410 may be formed over a substrate 400 in which a predetermined structure is formed. The first conductive lines 410 may be formed by forming a conductive layer for the first conductive lines 410 and etching the conductive layer using a mask pattern in a line shape extending in a first direction. An insulating layer (not shown) may be formed between the substrate 400 and the first conductive lines 410.

A first dielectric layer 401 may be formed on the first conductive lines 410.

Figure 4B:
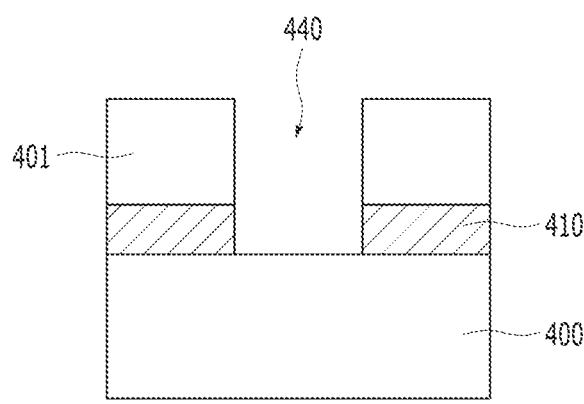

Referring to FIG. 4B, a via hole 440 passing through the first dielectric layer 401 and the first conductive lines 410 may be formed. The via hole 440 may be a space where a selector layer (see, reference numeral 421 of FIG. 4D) and a first electrode layer (see, reference numeral 422 of FIG. 4D) may be formed in a subsequent process.

The via hole 440 may be formed by etching the first dielectric layer 401 and the first conductive lines 410 to expose the substrate 200. When the insulating layer (not shown) is formed between the substrate 400 and the first conductive lines 410, the dielectric layer may be exposed by the via hole 440.

The etch process for forming the via hole 440 may be a wet etch process or a dry etch process.

Figure 4C:
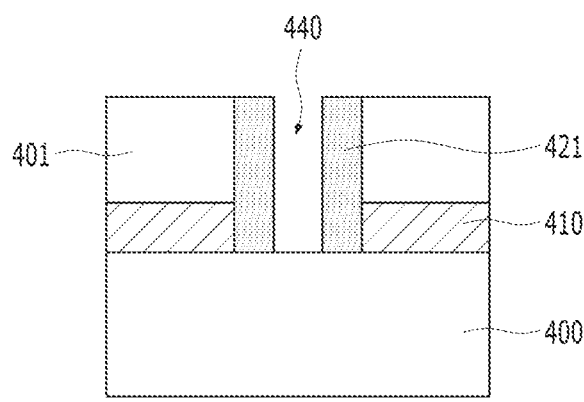

Referring to FIG. 4C, the selector layer 421 may be formed on sidewalls of the via hole 440 in the via hole 440.

The selector layer 421 may be formed by forming a material layer for the selector layer 421 on the sidewalls of the via hole 440 and over the first dielectric layer 401 and performing the planarization process to expose an upper surface of the first dielectric layer 401.

Figure 4D:
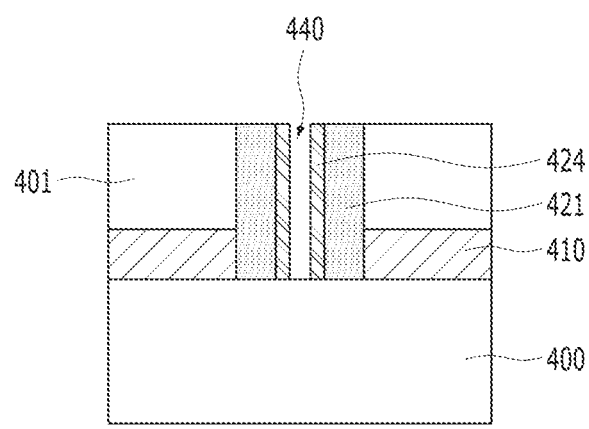

Referring to FIG. 4D, the contact layer 424 may be formed on sidewalls of the selector layer 421 in the via hole 440.

In some implementations, the contact layer 424 may function as an adhesion layer or an ohmic contact layer between a first electrode layer (see, reference numeral 422 of FIG. 4E) and the selector layer 421. In some implementations, the contact layer 424 may function as a passivation layer to prevent a reaction or diffusion between the first electrode layer 422 and the selector layer 421.

The contact layer 424 may include Platinum (Pt), titanium (Ti), titanium nitride (TiN), palladium (Pd), iridium (Ir), tungsten (W), tantalum (Ta), hafnium (Hf), niobium (Nb), vanadium (V), tantalum nitride (TaN), niobium nitride (NbN), a combination thereof, or an alloy thereof with another conductive material.

The contact layer 424 may be formed by forming a material layer for the contact layer 424 on the sidewalls of the selector layer 421 and over the first dielectric layer 401 and performing a planarization process to expose an upper surface of the first dielectric layer 401.

Figure 4E:
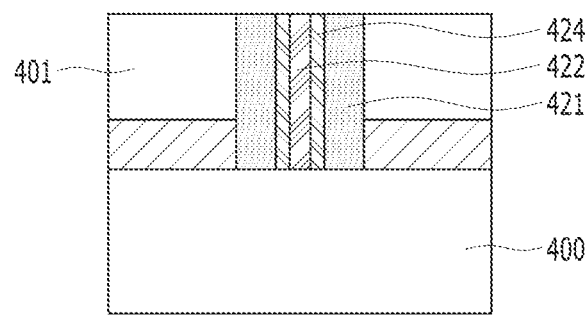

Referring to FIG. 4E, the first electrode layer 422 may be formed to fill the spaces in the via hole 440. The first electrode layer 422 may be buried in the spaces surrounded by the contact layer 424 in the via hole 440.

In some implementations, the first electrode layer 422 may be formed by forming a material layer for the first electrode layer 422 to cover the first dielectric layer 401 and fill the via hole 440 and performing a planarization process to expose an upper surface of the first dielectric layer 401.

As such, the first electrode layer 422 buried in the via hole 440 passing through the first dielectric layer 401 and the first conductive lines 410, the contact layer 424 surrounding the side surfaces of the first electrode layer 422 in the via hole 440, and the selector layer 421 surrounding the side surfaces of the contact layer 424 in the via hole 440 may be formed.

In the implementation, the planarization processes may be separately performed on each of the material layer for the selector layer 421, the material layer for the contact layer 424 and the material layer for the first electrode layer 422 to form the selector layer 421, the contact layer 424 and the first electrode layer 422. However, in another implementation, the planarization process may be performed on all of the material layer for the selector layer 421, the material layer for the contact layer 424 and the material layer for the first electrode layer 422 to form the selector layer 421, the contact layer 424 and the first electrode layer 422. That is, the selector layer 421, the contact layer 424 and the first electrode layer 422 may be formed by forming the material layer for the selector layer 421 to cover the sidewalls of the via hole 440 and the first dielectric layer 401, forming the material layer for the contact layer 424 to cover the material layer for the selector layer 421, forming the material layer for the first electrode layer 422 to cover the material layer for the contact layer 424 and fill the via hole 440 and performing the planarization process to expose the upper surface of the first electrode layer 422.

Figure 4F:
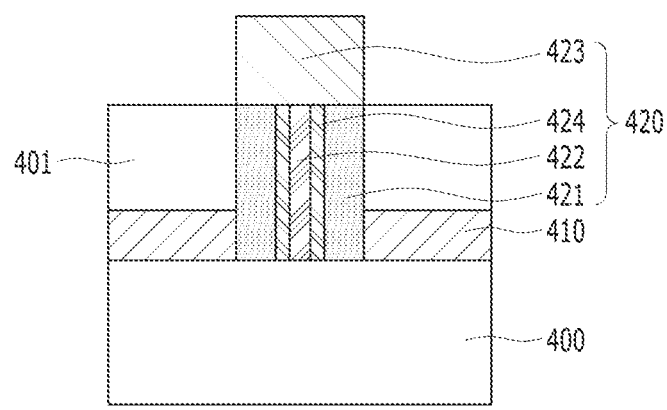

Referring to FIG. 4F, a variable resistance layer 423 may be formed over the selector layer 421, the contact layer 424 and the first electrode layer 422.

The variable resistance layer 423 may be formed by forming material layers for the variable resistance layer 423 and patterning the material layers using a mask pattern (not shown). The patterning process may include a etch process such as an ion beam etch (IBE) process.

In accordance with the implementation, before patterning the variable resistance layer 423, the selector layer 421 has been already formed in the via hole 440 in a direction perpendicular to the surfaces of the first dielectric layer 401 and the first conductive lines 410. Therefore, when patterning the variable resistance layer 423, it is possible to prevent materials included in the variable resistance layer 423 from re-depositing or knocking on the sidewalls of the selector layer 421. Accordingly, it is possible to effectively prevent break down or deterioration of the selector layer 421 caused by re-deposition or knocking when pattering the variable resistance layer 423 and improve the performance of the selector layer 421. In addition, according to the implementation, since the selector layer 421 may be formed in a vertical direction, it is possible to reduce the influence of the surface roughness of the selector layer 421 and thus prevent deterioration of the performance of the variable resistance layer 423.

Figure 4G:
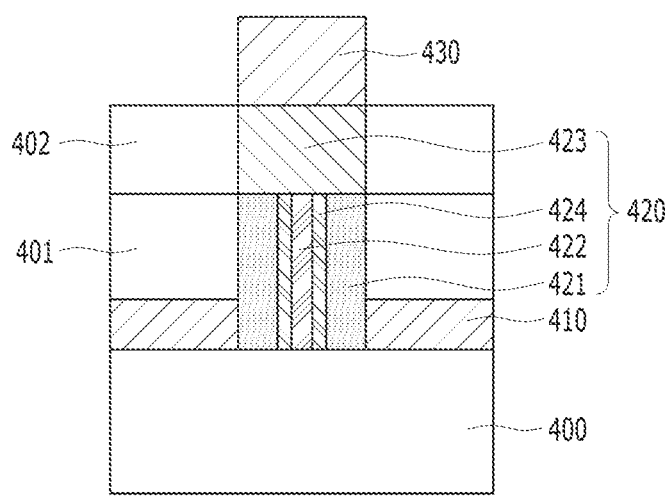

Referring to FIG. 4G, a second dielectric layer 402 may be formed to surround the side surfaces of the variable resistance layer 423 on the structure of FIG. 4F.

Second conductive lines 430 may be formed over the variable resistance layer 423.

The second conductive lines 430 may be formed by forming a conductive layer for the second conductive lines 430 and etching the conductive layer using a mask pattern in a line shape extending in a second direction. The second conductive lines 230 may have include a single-layer or multilayer structure including one or more of various conductive materials.

The semiconductor device fabricated by the method of FIGS. 4A to 2G may include the substrate 400, the first conductive lines 410, a memory cell 420, the second conductive lines 430, the first dielectric layer 401 and the second dielectric layer 402. The memory cell 420 may include the selector layer 421, the first electrode layer 422, the variable resistance layer 423 and the contact layer 424. The first electrode layer 422 may fill the via hole 440 and be surrounded by the contact layer 424. The selector layer 421 may be formed in the via hole 440 and surround the side surfaces of the contact layer 424. The selector layer 421 may be formed in a vertical direction with respect to the surfaces of the substrate 400, the first conductive lines 410, the second conductive lines 430, the first dielectric layer 401 and the second dielectric layer 202. The contact layer 424 may be formed in the via hole 440 and interposed between the first electrode layer 422 and the selector layer 421.

According to the implementation, since the first electrode layer 422 and the selector layer 421 may be formed in a vertical direction in the via hole 440, it is possible to prevent re-deposition or knocking on the sidewalls of the selector layer 221 when pattering the variable resistance layer 423. Therefore, the performance of the selector layer 421 can be improved and the deterioration of the variable resistance layer 223 caused by the surface roughness can be prevented. Further, according to the implementation, the semiconductor device further includes the contact layer 424 to improve an adhesion or ohmic property and prevent a reaction or diffusion between the first electrode layer 422 and selector layer 421.

The substrate 400, the first conductive lines 410, the memory cell 420, the second conductive lines 430, the first dielectric layer 401, the second dielectric layer 402, the selector layer 421, the first electrode layer 422 and the variable resistance layer 423 shown in FIGS. 4A to 4G may correspond to the substrate 200, the first conductive lines 210, the memory cell 220, the second conductive lines 230, the first dielectric layer 201, the second dielectric layer 202, the selector layer 221, the first electrode layer 222 and the variable resistance layer 223 shown in FIGS. 2A to 2G, respectively, and the substrate 100, the first conductive lines 110, the memory cell 120, the second conductive lines 130, the first dielectric layer 101, the second dielectric layer 102, the selector layer 121, the first electrode layer 122 and the variable resistance layer 123 shown in FIG. 1B, respectively.

FIGS. 5 to 8 illustrate a semiconductor device based on some implementations of the disclosed technology.

Figure 5:
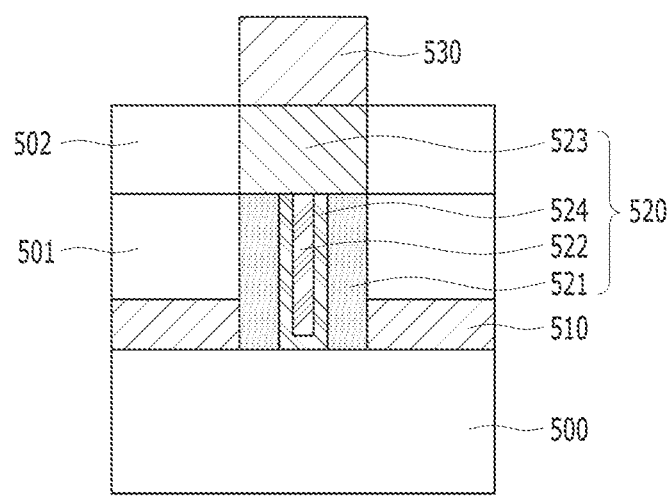
FIGS. 5 to 8 illustrate a semiconductor device based on some implementations of the disclosed technology.

The implementation shown in FIG. 5 may be similar to the implementation shown in FIG. 4G except that a contact layer 524 may be formed to surround side surfaces and lower surface of the first electrode layer 422.

The semiconductor device shown in FIG. 5 may include substrate 500, first conductive lines 510, a memory cell 520, second conductive lines 530, a first dielectric layer 501 and a second dielectric layer 502. The memory cell 530 may include a selector layer 521, a first electrode layer 522 and a variable resistance layer 523 and the contact layer 524. The selector layer 521 may be formed on sidewalls of a via hole passing through the first dielectric layer 501 and the first conductive lines 510 in the via hole. The side surfaces and the lower surface of the first electrode layer 522 may be surrounded by the contact layer 524 in the via hole. The contact layer 524 may be formed in the via hole and surround the side surfaces and the lower surface of the first electrode layer 522. The contact layer 524 may be interposed between the selector layer 521 and the first electrode layer 522, and between the first conductive lines 510 and the first electrode layer 522.

The substrate 500, the first conductive lines 510, the memory cell 520, the second conductive lines 530, the first dielectric layer 501, the second dielectric layer 502, the selector layer 521, the first electrode layer 522 and the variable resistance layer 523 shown in FIG. 5 may correspond to the substrate 400, the first conductive lines 410, the memory cell 420, the second conductive lines 430, the first dielectric layer 401, the second dielectric layer 402, the selector layer 421, the first electrode layer 422 and the variable resistance layer 423 shown in FIG. 4G, respectively, the substrate 200, the first conductive lines 210, the memory cell 220, the second conductive lines 230, the first dielectric layer 201, the second dielectric layer 202, the selector layer 221, the first electrode layer 222 and the variable resistance layer 223 shown in FIG. 2G, respectively, and the substrate 100, the first conductive lines 110, the memory cell 120, the second conductive lines 130, the first dielectric layer 101, the second dielectric layer 102, the selector layer 121, the first electrode layer 122 and the variable resistance layer 123 shown in FIG. 1B, respectively.

Figure 6:
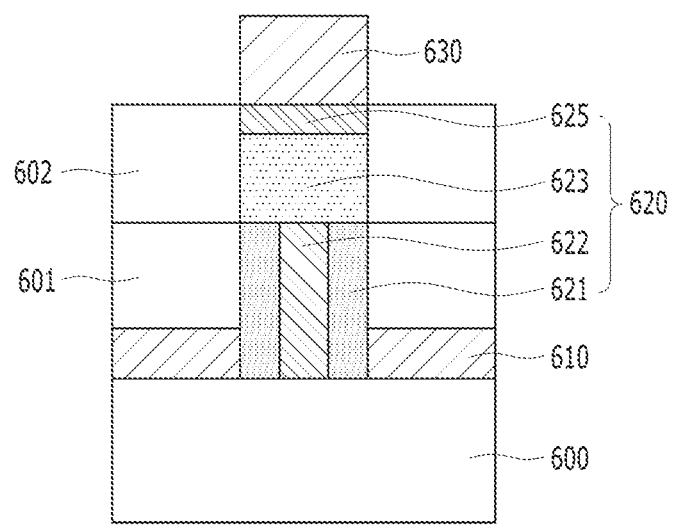

The implementation shown in FIG. 6 may be similar to the implementation shown in FIG. 2G except that a second electrode layer 625 may be formed between a variable resistance layer 623 and a second conductive lines 630.

The second electrode layer 625 may be disposed at an uppermost portion of a memory cell 620 and function as a transmission path of a voltage or a current between the rest of the memory cell 620 and a corresponding one of the second conductive lines 630.

The second electrode layer 625 may include a single-layer or multilayer structure including various conductive materials such as a metal, a metal nitride, a conductive carbon material, or a combination thereof. For example, the second electrode layer 625 may include tungsten (W), titanium (Ti), tantalum (Ta), platinum (Pt), aluminum (Al), copper (Cu), copper (Cu), zinc (Zn), nickel (Ni), cobalt (Co), lead (Pb), tungsten nitride (WN), tungsten silicide (WSi), titanium nitride (TiN), titanium silicon nitride (TiSiN), titanium aluminum nitride (TiAlN), tantalum nitride (TaN), tantalum silicon nitride (TaSiN), tantalum aluminum nitride (TaAlN), carbon (C), silicon carbide (SiC), or silicon carbon nitride (SiCN), or a combination thereof.

The second electrode layer 625 may be formed of the same material as or a different material from a first electrode layer 622.

In some implementations, the second electrode layer 625 and the variable resistance layer 623 may be formed by sequentially forming a material layer for a variable resistance layer 623 and a material layer for the second electrode layer 625 on the structure where a selector layer 621 and the first electrode layer 622 are formed and etching the material layer for the second electrode layer 625 and the material layer for the variable resistance layer 623 using a hard mask pattern.

In some implementations, the second electrode layer 625 may be separately formed by an individual patterning process. That is, the second electrode layer 625 may be formed by forming the material layer for the variable resistance layer 623 on the structure where the selector layer 621 and the first electrode layer 622 are formed, etching the material layer using a hard mask pattern to form the variable resistance layer 623, forming the material layer for the second electrode layer 625 on the structure where the variable resistance layer 623 is formed and etching the material layer using a hard mask pattern.

The semiconductor device shown in FIG. 6 may include the substrate 600, the first conductive lines 610, the memory cell 620, the second conductive lines 630, the first dielectric layer 601 and the second dielectric layer 602. The memory cell 620 may include the selector layer 621, the first electrode layer 622, the variable resistance layer 623 and the second electrode layer 625. The selector layer 621 may be formed in a via hole passing through the first dielectric layer 601 and the first conductive lines 610 to surround the first electrode layer 622. The selector layer 621 may be formed in a vertical direction with respect to the surfaces of the substrate 600, the first conductive lines 610, the second conductive lines 630, the first dielectric layer 601 and the second dielectric layer 602. The first electrode layer 622 may be surrounded by the selector layer 621 in the via hole.

The substrate 600, the first conductive lines 610, the memory cell 620, the second conductive lines 630, the first dielectric layer 601, the second dielectric layer 602, the selector layer 621, the first electrode layer 622 and the variable resistance layer 623 shown in FIG. 6 may correspond to the substrate 200, the first conductive lines 210, the memory cell 220, the second conductive lines 230, the first dielectric layer 201, the second dielectric layer 202, the selector layer 221, the first electrode layer 222 and the variable resistance layer 223 shown in FIG. 2G, respectively, and the substrate 100, the first conductive lines 110, the memory cell 120, the second conductive lines 130, the first dielectric layer 101, the second dielectric layer 102, the selector layer 121, the first electrode layer 122 and the variable resistance layer 123 shown in FIG. 1B, respectively.

Figure 7:
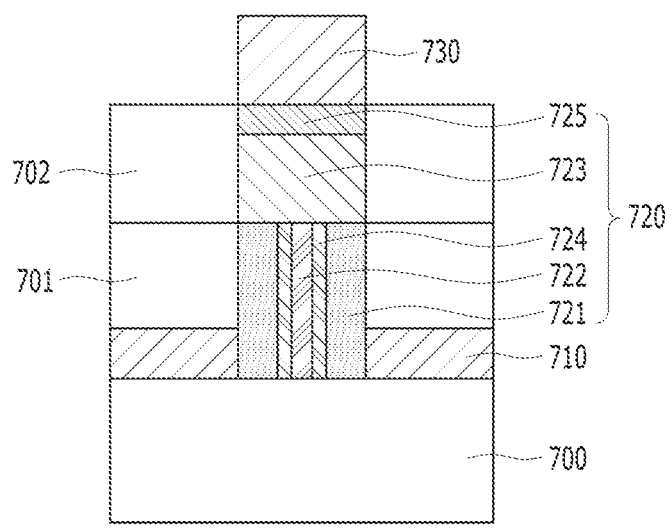

The implementation shown in FIG. 7 may be similar to the implementation shown in FIG. 4G except that a second electrode layer 725 may be formed between a variable resistance layer 723 and second conductive lines 730.

The second electrode layer 725 may be disposed at an uppermost portion of the memory cell 720 and function as a transmission path of a voltage or a current between the rest of the memory cell 720 and a corresponding one of the second conductive lines 730.

The second electrode layer 725 may include a single-layer or multilayer structure including various conductive materials such as a metal, a metal nitride, a conductive carbon material, or a combination thereof.

The second electrode layer 725 may be formed of the same material as or a different material from a first electrode layer 722.

In some implementations, the second electrode layer 725 may be patterned together with the variable resistance layer 723.

In some implementations, the second electrode layer 725 may be patterned separately from the variable resistance layer 723.

The semiconductor device shown in FIG. 7 may include a substrate 700, first conductive lines 710, the memory cell 720, the second conductive lines 730, a first dielectric layer 701 and a second dielectric layer 702. The memory cell 720 may include a selector layer 721, the first electrode layer 722, the variable resistance layer 723, a contact layer 724 and the second electrode layer 725. The first electrode layer 722 may be formed in a via hole passing through the first dielectric layer 701 and the first conductive lines 710 and surrounded by the contact layer 724. The selector layer 721 may be surround side surfaces of the contact layer 724 in the via hole. The selector layer 721 may be formed a vertical direction with respect to surfaces of the substrate 700, the first conductive lines 710, the second conductive lines 730, the first dielectric layer 701 and the second dielectric layer 702. The contact layer 724 may be interposed between the first electrode layer 722 and the selector layer 721 in the via hole.

The substrate 700, the first conductive lines 710, the memory cell 720, the second conductive lines 730, the first dielectric layer 701, the second dielectric layer 702, the selector layer 721, the first electrode layer 722, the variable resistance layer 723 and the contact layer 724 shown in FIG. 7 may correspond to the substrate 400, the first conductive lines 410, the memory cell 420, the second conductive lines 430, the first dielectric layer 401, the second dielectric layer 402, the selector layer 421, the first electrode layer 422, the variable resistance layer 423 and the contact layer 424 shown in FIG. 4G, respectively.

Figure 8:
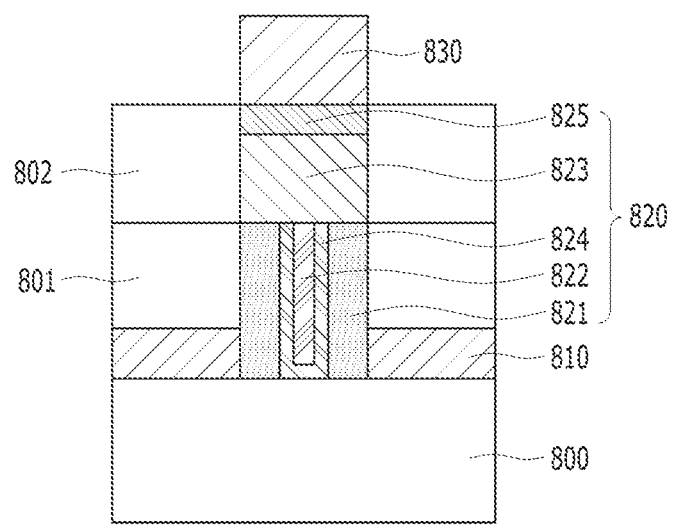

The implementation shown in FIG. 8 may be similar to the implementation shown in FIG. 5 except that a second electrode layer 825 may be formed between a variable resistance layer 823 and a second conductive lines 830.

The second electrode layer 825 may be disposed at an uppermost portion of a memory cell 820 and function as a transmission path of a voltage or a current between the rest of the memory cell 820 and a corresponding one of the second conductive lines 830.

The second electrode layer 825 may include a single-layer or multilayer structure including various conductive materials such as a metal, a metal nitride, a conductive carbon material, or a combination thereof.

The second electrode layer 825 may be formed of the same material as or a different material from a first electrode layer 822.

In some implementations, the second electrode layer 825 may be patterned together with the variable resistance layer 823.

In some implementations, the second electrode layer 825 may be patterned separately from the variable resistance layer 823.

The semiconductor device shown in FIG. 8 may include a substrate 800, first conductive lines 810, the memory cell 820, the second conductive lines 830, a first dielectric layer 801 and a second dielectric layer 802. The memory cell 820 may include a selector layer 821, the first electrode layer 822, the variable resistance layer 823 and a contact layer 824. The selector layer 821 may be formed in a via hole passing through the first dielectric layer 801 and the first conductive lines 810. The selector layer 821 may be formed in a vertical direction with respect to the surfaces of the substrate 800, the first conductive lines 810, the second conductive lines 830, the first dielectric layer 801 and the second dielectric layer 802. Side surfaces and a lower surface of the first electrode layer 822 may be surrounded by the contact layer 824 in the via hole. The contact layer 824 may be disposed in the via hole to surround the side surfaces and the lower surfaces of the first electrode layer 822. The contact layer 824 may be interposed between the selector layer 821 and the first electrode layer 822, and between the first conductive lines 810 and the first electrode layer 822.

The substrate 800, the first conductive lines 810, the memory cell 820, the second conductive lines 830, the first dielectric layer 801, the second dielectric layer 802, the selector layer 821, the first electrode layer 822 and the variable resistance layer 823 shown in FIG. 8 may correspond to the substrate 500, the first conductive lines 510, the memory cell 520, the second conductive lines 530, the first dielectric layer 501, the second dielectric layer 502, the selector layer 521, the first electrode layer 522 and the variable resistance layer 523 shown in FIG. 5, respectively.

Only a few embodiments and examples are described. Enhancements and variations of the disclosed embodiments and other embodiments can be made based on what is described and illustrated in this patent document.

What is claimed is:
1. A semiconductor device, comprising:
a first conductive line including an opening passing through the first conductive line;
a second conductive line disposed over the first conductive line to be spaced apart from the first conductive line;
a first electrode layer buried in the opening;
a selector layer disposed in the opening and surrounding side surfaces of the first electrode layer;
a variable resistance layer disposed over the selector layer and the first electrode layer; and
a first dielectric layer and a second dielectric layer that are disposed between the first conductive line and the second conductive line,
wherein the first dielectric layer is disposed between the first conductive line and the second dielectric layer,
wherein the second dielectric layer is disposed on the first dielectric layer and surrounding side surfaces of the variable resistance layer, and
wherein the opening is disposed to pass through the first conductive line and the first dielectric layer.

2. The semiconductor device according to claim 1, wherein the selector layer and the first electrode layer are disposed in a vertical direction with respect to surfaces of the first conductive line, the variable resistance layer and the second conductive line.

3. The semiconductor device according to claim 1, wherein the variable resistance layer includes materials having a variable resistance characteristic used for resistive random access memory (RRAM), phase-change random access memory (PRAM), ferroelectric random access memory (FRAM), magnetic random access memory (MRAM), or a combination thereof.

4. The semiconductor device according to claim 1, wherein the selector layer includes a metal insulator transition (MIT) material, a mixed ion-electron conducting (MIEC) material, an ovonic threshold switching material including a chalcogenide material, a tunneling dielectric material, a doped dielectric material, or a combination thereof.

5. The semiconductor device according to claim 1, wherein the first electrode layer includes a metal, a metal nitride, a conductive carbon material, or a combination thereof.

6. The semiconductor device according to claim 1, further comprising a contact layer interposed between the first electrode layer and the selector layer.

7. The semiconductor device according to claim 6, wherein the contact layer includes Platinum (Pt), titanium (Ti), titanium nitride (TiN), palladium (Pd), iridium (Ir), tungsten (W), tantalum (Ta), hafnium (Hf), niobium (Nb), vanadium (V), tantalum nitride (TaN), niobium nitride (NbN), a combination thereof, or an alloy thereof with another conductive material.

8. The semiconductor device according to claim 1, further comprising a contact layer interposed between the first electrode layer and the selector layer, and between the first electrode layer and the first conductive line.

9. The semiconductor device according to claim 8, wherein the contact layer includes Platinum (Pt), titanium (Ti), titanium nitride (TiN), palladium (Pd), iridium (Ir), tungsten (W), tantalum (Ta), hafnium (Hf), niobium (Nb), vanadium (V), tantalum nitride (TaN), niobium nitride (NbN), a combination thereof, or an alloy thereof with another conductive material.

10. The semiconductor device according to claim 1, further comprising a second electrode layer disposed between the variable resistance layer and the second conductive line.

11. The semiconductor device according to claim 10, wherein the second electrode layer includes a metal, a metal nitride, a conductive carbon material, or a combination thereof.

12. The semiconductor device according to claim 10, wherein the first electrode layer and the second electrode layer include a same material, or different materials from each other.

* * * * *